United States Patent [19]

Natzke et al.

[11] 4,295,287
[45] Oct. 20, 1981

[54] BACKHOE BUCKET QUICK COUPLER

[75] Inventors: Ronald C. Natzke, Burlington; Thomas R. Brown, Yarmouth, both of Iowa

[73] Assignee: J. I. Case Company, Racine, Wis.

[21] Appl. No.: 139,037

[22] Filed: Apr. 10, 1980

[51] Int. Cl.³ .............................................. E02F 3/70
[52] U.S. Cl. ..................................... 37/103; 414/723; 403/316; 403/321; 37/118 R
[58] Field of Search ................... 37/103, 117.5, 118 R; 172/272; 414/723, 724; 403/315–318, 321

[56] References Cited

U.S. PATENT DOCUMENTS

| | | | |
|---|---|---|---|
| 3,556,323 | 1/1971 | Helmmermann | 414/723 |
| 3,672,521 | 6/1972 | Bauer et al. | 414/723 |
| 4,056,250 | 11/1977 | Uchiyama | 37/103 |
| 4,133,121 | 1/1979 | Hemphill | 37/118 R |
| 4,187,050 | 2/1980 | Barbee | 414/723 |
| 4,213,731 | 7/1980 | Verachtert | 37/117.5 X |
| 4,214,840 | 7/1980 | Beales | 403/317 X |
| 4,225,283 | 9/1980 | Baker et al. | 414/723 |
| 4,243,356 | 1/1981 | Takojima | 37/117.5 |
| 4,253,793 | 3/1981 | Brami | 414/723 |

FOREIGN PATENT DOCUMENTS

| | | | |
|---|---|---|---|
| 2500217 | 7/1975 | Fed. Rep. of Germany | 37/118 R |
| 2511819 | 9/1976 | Fed. Rep. of Germany | 37/103 |

Primary Examiner—E. H. Eickholt
Attorney, Agent, or Firm—Cullen, Sloman, Cantor, Grauer, Scott & Rutherford

[57] ABSTRACT

A quick coupling bucket mounting mechanism is disclosed for coupling a material handling bucket, blade, compactor, impact hammer or other attachment to the free end of a scoop arm extending from a loader or backhoe. A quick coupler is provided which is pivotally mounted to the loader scoop arm for readily receiving various types and sizes of attachments. The quick coupler has a three-leg configuration including a pair of bucket mounting legs adaptable for engagement with a bucket mounting pin. One end of each bucket mounting leg has a hook portion which cooperatively locks around lateral projections of the bucket mounting pin. A releasable latch mechanism is pivotally mounted on the third leg of the quick coupler for engagement with a complementary latch pin on the bucket. The latch mechanism is selectively rotatable to two positions. In a first position, it is aligned with and forms an opening which permits the quick coupler to be seated on the bucket latch pin. The latch mechanism is then rotated to a second position which closes the opening thereby providing a bearing mounting for the bucket latch pin in the latch mechanism. In the latched position of the quick coupler, a quick and reliable coupled connection is formed between the bucket and loader scoop arm.

2 Claims, 4 Drawing Figures

BACKHOE BUCKET QUICK COUPLER

BACKGROUND OF THE INVENTION

The present invention relates to an apparatus for attaching implements to the free end of a tractor loader boom and more particularly to an improved and simplified quick attachment and release device for attaching buckets or the like to a loader or backhoe scoop arm.

It is known to provide backhoes or similar types of earth-working machines with different sizes and types of material handling implements or buckets to perform numerous working operations. Changing from one bucket to another is a problem because of the time and labor expended in the changeover. The buckets are heavy and awkward to manipulate and many times special tools are required to make the changeover. It is an object of this invention to provide a quick-attaching and release mechanism for easily coupling and releasing different buckets to the same loader boom structure.

In prior art backhoes, the buckets are typically pinned to the actuating arms of the loader scoop arm during periods of use. Since the buckets are heavy items, a great deal of time and effort is required to release the bucket from the scoop arm for repairs to the bucket or the actuating arms. Further, after a period of use, dirt and corrosion often render removal of the bucket from the loader quite difficult. The problems encountered by using bolts and nuts or pins as the attachment and release mechanisms for loader buckets has resulted in reduced flexibility in using a loader in connection with other buckets and undesirable features in performing maintenance on the bucket and loader.

The prior art semi-automatic devices for attaching and releasing implements on loaders have eliminated many of the problems associated with the use of bolts and nuts or pins. However, due to the design of such prior art devices, fatigue and fracture continue to be a problem, and dirt often causes the complex operative elements of the attachment and release devices to become jammed. Further, the latching devices are often activated from the machine's operator station which necessitates an additional operator action. Thus, several of the problems associated with manual attachment devices also exist when semi-automatic quick-attachment and release devices of the prior art are utilized.

These disadvantages of present quick-attaching mechanisms have resulted in the present quick coupling device for attaching a material handling implement or bucket to a loader's boom structure. The quick coupling device of the present invention is compatible with existing buckets designed for a pinned connection to the machine's boom structure.

SUMMARY OF THE INVENTION

In accordance with the present invention, the improved attachment and release mechanism permits various buckets to be used with the same scoop arm, and it permits a bucket to be attached or released from the scoop arm in a minimum of time and with a minimum of effort.

It is an object of the present invention to provide a quick coupling bucket mounting mechanism which is pivotally connected to the loader's scoop arm. The quick coupling has a three-leg configuration, and it includes a pair of bucket mounting legs which are adapted for engagement with a bucket mounting pin. One end of each bucket mounting leg has a hook portion which cooperatively locks around lateral projections of the bucket mounting pin. A releasable latch mechanism is pivotally mounted on the third leg of the quick coupler for locking engagement with a complementary latch pin on the bucket. In the latched position of the quick coupler, a quick and reliable coupled connection is formed between the bucket and loader scoop arm.

A further feature of the present invention resides in the cooperation between the latch mechanism and quick coupler for causing locking engagement or disengagement between the quick coupler and the bucket. The latch mechanism includes a cylindrically shaped main body having a slot along its longitudinal extent which is slightly larger than the diameter of the bucket latch pin. The latch mechanism is pivotally mounted between spaced apart side members which form the third leg of the quick coupler. Each side member includes a cylindrical bearing for rotatably holding one end of the latch mechanism, and a tapered slot is provided in each bearing which has one end with substantially the same size opening as the slot through the cylindrical body of the latch mechanism.

The latch mechanism is selectively rotatable to two positions. In a first position, the slot in the latch mechanism is axially aligned with the tapered slots in the bearings to form an opening which permits the quick coupler to be seated on the bucket latch pin with the cylindrical body of the latch mechanism then forming a bearing for the pin. Then, the latch mechanism is rotated to its second position which closes the opening thereby providing a mounting for the bucket latch pin in the latch mechanism.

Other advantages and meritorious features of the quick attachment and release construction of the present invention will be more fully understood from the following description of the preferred embodiment, the appended claims, and the drawings, a brief description of which follows.

DESCRIPTION OF THE PREFERRED EMBODIMENT

Figure 1:
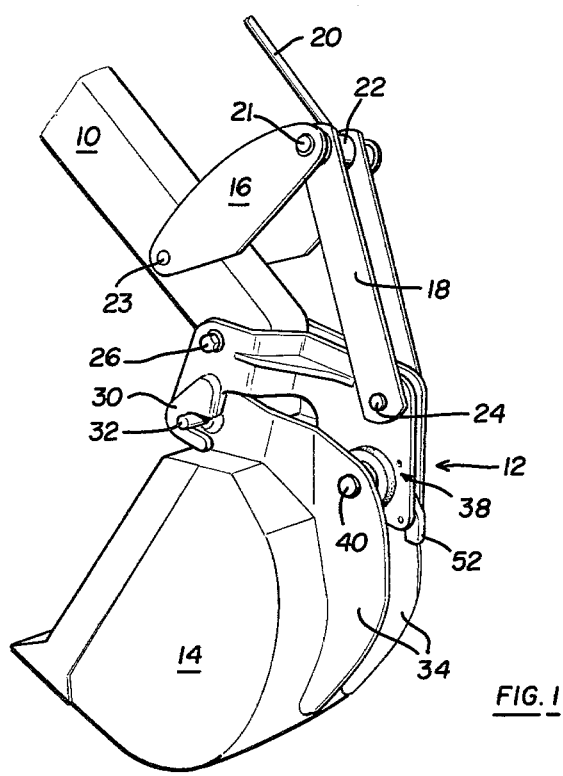
FIG. 1 is a perspective view of a loader scoop arm and bucket connected by the quick coupler of the present invention and illustrating the mechanism in its latched position.

A tractor mounted backhoe having an extensible dipper stick 10 and quick coupling mechanism 12 according to the present invention is illustrated in FIGS. 1-4. The backhoe assembly includes a rearwardly projecting boom (not shown) to which is connected the dipper stick 10 in a conventional manner. A bucket assembly 14 is pivotally attached to the end of the dipper stick by the quick attachment and release device 12 of the present invention.

The quick attaching mechanism includes a four-bar bucket mounting linkage pivotally mounted to the dipper stick 10 to readily attach various types and sizes of buckets. The four-bar bucket mounting linkage includes dipper stick links 16, push-pull links 18, quick coupler 12, and part of the dipper stick between links 16 and coupler 12. Piston rod 20 of a hydraulically actuated cylinder (not shown) is attached at its eye end 22 to one corner of the four-bar linkage by pin 21. Extension and retraction of the hydraulic cylinder causes the bucket assembly to pivot toward and away from dipper stick 10 thereby permitting the backhoe bucket to dig or dump.

Pin 21 pivotally connects one end of links 16, one end of links 18, and piston rod 20. Links 16 are pivotally attached at their other ends to dipper stick 10 by pin 23. Push-pull links 18 are pivotally connected to quick coupler 12 by pin 24. Quick coupler 12 is pivotally attached to dipper stick 10 by pin 26. Thus, the four-bar configuration for coupling bucket 14 includes links 16 and 18, quick coupler 12, and that portion of dipper stick 10 between pins 23 and 26.

Quick coupler 12 has a three-leg configuration as illustrated in FIG. 1, and it includes a pair of bucket mounting legs 30 on opposite sides of dipper stick 10 which are adapted for engagement with bucket mounting pin 32. One end of each bucket leg 30 has a hook portion which cooperatively locks around lateral projections of the bucket mounting pin 32 that extend from bucket mounting brackets 34.

Figure 3:
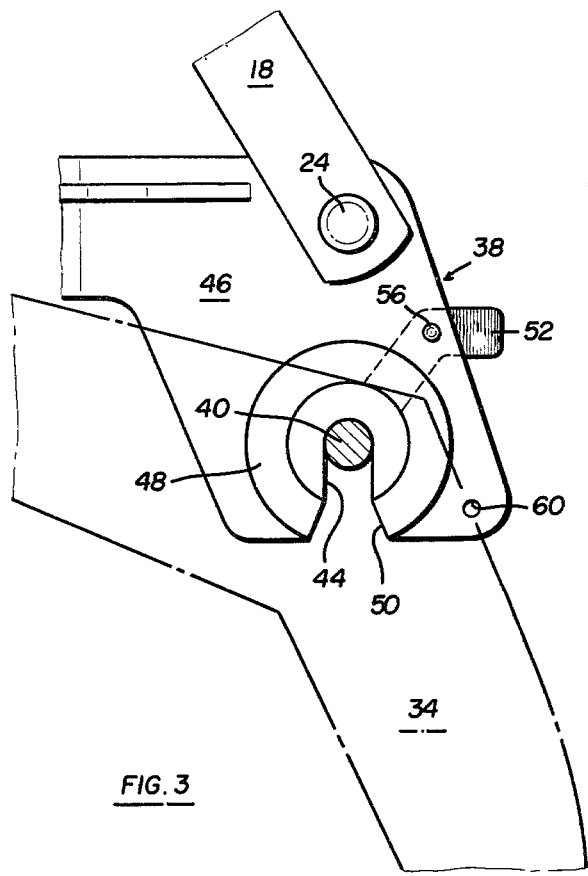
FIG. 3 is a partial side elevational view illustrating the attachment mechanism in its unlatched position.

The bucket 14 is locked to the quick coupler 12 by a releasable latch mechanism 36 which is pivotally mounted on the third leg 38 of quick coupler 12 for engagement with a complementary latch pin 40 mounted to the bucket mounting brackets 34. Latch mechanism 36 includes a cylindrically shaped main body 42 having a slot 44 along its longitudinal extent which is slightly larger than the diameter of bucket latch pin 40. Latch mechanism 36 is rotatably mounted between spaced apart side members 46 which form the third leg 38 of the quick coupler 12. Each side member 46 includes a cylindrical bearing 48 for rotatably holding one end of the latch mechanism. As illustrated in FIG. 3, a tapered slot 50 is provided in each bearing 48 which has one end with substantially the same size opening as slot 44 through latch mechanism 36. The tapered slots 50 assist in the alignment and guiding of the quick coupler 12 onto bucket latch pin 40.

Figure 2:
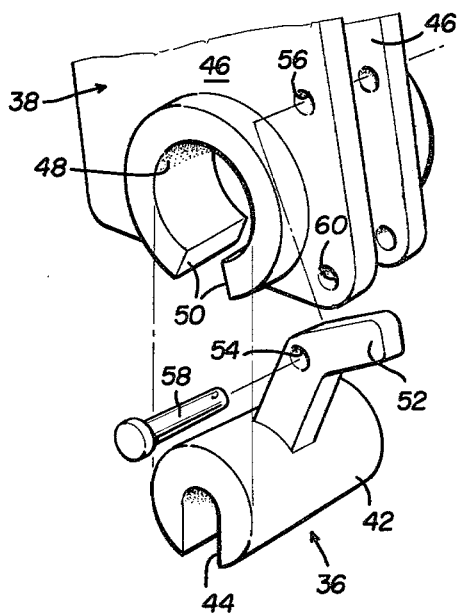
FIG. 2 is a detail perspective of the latch mechanism and the third leg of the quick coupler.
Figure 4:
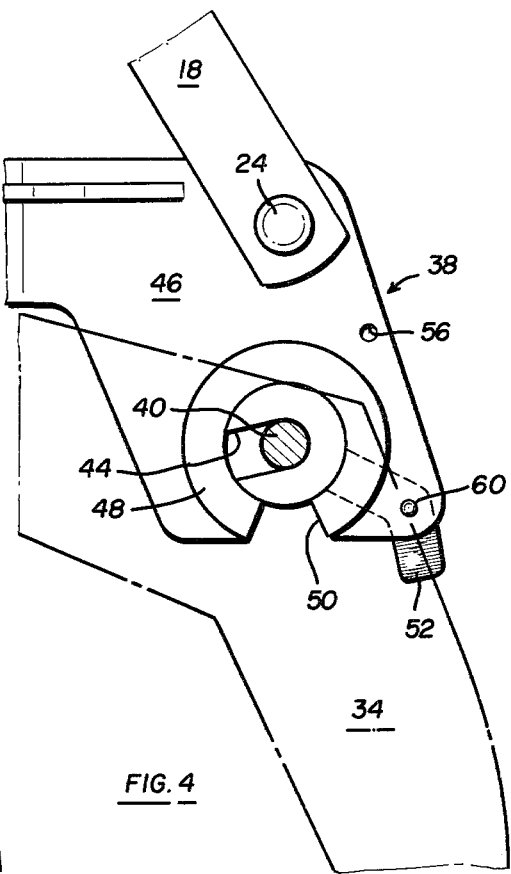
FIG. 4 is a partial side elevational view illustrating the attachment mechanism in its latched position.

The latch mechanism 36 is selectively rotatable to two positions. In a first position, as illustrated in FIGS. 2 and 3, opening 54 through latch arm 52 of latch mechanism 36 is aligned with and held at side member opening 56 by pin 58. In this position, the slot 44 in cylindrical body 42 is axially aligned with slots 50 in bearing 48 to form an opening which permits the quick coupler 12 to be seated on bucket latch pin 40 as illustrated in FIG. 3. Then, pin 58 is removed and latch arm 52 is rotated to a second position, as illustrated in FIG. 4, wherein opening 54 is aligned with opening 60 through side members 46 and held in that position by pin 58. This closes the opening formed by slot 44 and slots 50 thereby providing a mounting for the bucket latch pin 40 in the latch mechanism 36.

Bucket 14 is coupled to the quick attaching mechanism as follows. The operator positions the backhoe in alignment with bucket 14 to cause the hook portions of legs 30 to cooperatively lock around the lateral projections of bucket mounting pin 32. The operator then extends piston rod 20 to rotate quick coupler 12 until slot 44 in cylindrical body 36 is seated over pin 40 in bucket 14 as illustrated in FIG. 3. Pin 58 is removed from opening 56, and latch arm 52 is rotated and then resecured again at opening 60 in side members 46. The backhoe is then ready for operation.

To uncouple the bucket 14 from the quick coupler 12, pin 58 is removed from opening 60, and latch arm 52 is rotated and secured at opening 56 at which time quick coupler 12 may be tilted to remove the hook portions of legs 30 from bucket mounting pin 32. Thus, the present quick attachment and release mechanism of the present invention allows the operator to quickly and easily couple and uncouple buckets to the dipper stick 10 in a simple manner.

It will be apparent to those skilled in the art that the foregoing disclosure is exemplary in nature rather than limiting, the invention being limited only by the appended claims.

What is claimed is:

1. A quick attachment and release mechanism for attaching a bucket to a loader scoop arm, said mechanism comprising:

a quick coupler pivotally mounted to an end of said scoop arm for receiving various types and sizes of buckets, said quick coupler having a three-leg configuration including a pair of bucket mounting legs pivotally mounted to opposite sides of said scoop arm end, each bucket mounting leg including a hook portion engaging a lateral projection of a mounting pin on said bucket;

a releasable latch mechanism rotatably mounted on a third leg of said quick coupler for engagement with a latch pin mounted on said bucket, said latch mechanism including a main body having a slot along its longitudinal extent, said main body rotatably mounted between spaced apart side members which form said third leg of said quick coupler;

each side member including a bearing for rotatably holding one end of said main body, each bearing including a slot, said bearing slots forming an opening through said side members which is substantially the same size as the opening formed by the slot in said main body;

a latch arm mounted to said main body, said latch arm being movable in the space between said side members for rotating said main body, said latch arm having an opening therein;

and said side members having spaced apart first and second latching openings, said opening in said latch arm being aligned with and secured to said first opening through said side members by pin means thereby axially aligning said slot in said main body with said bearing slots so that said main body slot may be seated on said bucket latch pin, and said opening in said latch arm being aligned with and secured to said second opening through said side members by said pin means thereby providing a mounting for said bucket latch pin in said main body for coupling said bucket to said quick coupler.

2. A quick attachment and release mechanism for attaching a bucket to a loader scoop arm, said mechanism comprising:

a quick coupler pivotally mounted to an end of said scoop arm for receiving various types and sizes of buckets;

said quick coupler including a pair of bucket mounting legs, said bucket mounting legs lockingly engaging a bucket mounting pin;

a latch mechanism rotatably mounted to said quick coupler, said latch mechanism including a main body having a slot along its longitudinal extent, means for selectively securing said main body at either an unlatched position or a latch position on said quick coupler; and said main body slot being aligned with a slot through said quick coupler in said unlatched position to form an opening so that said main body slot may be seated on a bucket latch pin, and said main body slot being rotated from said unlatched position to said latched position to lockingly engage said bucket latch pin and close said opening thereby coupling said bucket to said quick coupler.

* * * * *